(12) United States Patent
Wang

(10) Patent No.: US 8,624,521 B2
(45) Date of Patent: Jan. 7, 2014

(54) GROUND-ILLUMINATING LAMP FOR VEHICLE REARVIEW MIRROR

(76) Inventor: Jianzhong Wang, Xiamen (CN)

( * ) Notice: Subject to any disclaimer, the term of this patent is extended or adjusted under 35 U.S.C. 154(b) by 168 days.

(21) Appl. No.: 13/054,566

(22) PCT Filed: Aug. 4, 2008

(86) PCT No.: PCT/CN2008/071866
§ 371 (c)(1),
(2), (4) Date: Jan. 17, 2011

(87) PCT Pub. No.: WO2010/015118
PCT Pub. Date: Feb. 11, 2010

(65) Prior Publication Data
US 2011/0115377 A1    May 19, 2011

(51) Int. Cl.
*H05B 37/02* (2006.01)
*B60Q 1/26* (2006.01)

(52) U.S. Cl.
USPC .......................... 315/291; 362/276; 362/494

(58) Field of Classification Search
USPC .................. 315/209 R, 224, 225, 291, 307; 362/140, 276, 494, 510, 511, 516, 522, 362/540, 802
See application file for complete search history.

(56) References Cited

U.S. PATENT DOCUMENTS

| 5,871,275 | A | 2/1999 | O'Farrell et al. |
| 6,276,821 | B1 * | 8/2001 | Pastrick et al. ............... 362/494 |
| 6,474,853 | B2 * | 11/2002 | Pastrick et al. ............... 362/494 |
| 6,926,431 | B1 | 8/2005 | Foote et al. |
| 7,195,382 | B1 | 3/2007 | Foote |

FOREIGN PATENT DOCUMENTS

| CN | 2858387 Y | 1/2007 |
| CN | 2897731 Y | 5/2007 |
| CN | 200957790 Y | 10/2007 |
| DE | 3635471 A1 | 4/1988 |
| DE | 102004033896 A1 | 2/2006 |

OTHER PUBLICATIONS

International Search Report, mailing date May 14, 2009, for corresponding International Application No. PCT/CN2008/071866 with English translation.

* cited by examiner

*Primary Examiner* — Jimmy Vu
(74) *Attorney, Agent, or Firm* — Intellectual Property Law Group LLP

(57) ABSTRACT

A ground-illuminating lamp for a vehicle rearview mirror comprises a remote controller (2), a control circuit (1) and an illuminating lamp (3), wherein the remote controller (2) sends out instructions for turning on or turning off the illuminating lamp (3) to the control circuit (1) according to user's requirements, the control circuit (1) receives the instructions and controls the illuminating lamp (3) to turn on or turn off the illumination, and the illuminating lamp (3) is mounted at the lower portion of the rearview mirror.

5 Claims, 2 Drawing Sheets

GROUND-ILLUMINATING LAMP FOR VEHICLE REARVIEW MIRROR

FIELD OF THE INVENTION

The invention relates to a ground-illuminating lamp for vehicle rearview mirror, which can be used in various vehicles for easy observation of the surrounding on both sides of the car body and the status of the ground, so as to bring benefit to the driver and passengers to get on and off the vehicle.

DESCRIPTION OF RELATED ART

With today's rapid changing society, the rapid development of technology and continuously rising of the quality of people's living, the pace of working and living becomes progressively faster, in order to enjoy a high quality of living sufficiently, accommodate oneself to the fast pace and save time, more and more people choose to buy a vehicle, and it has become a trend to take a vehicle instead of walking.

People usually need to park the vehicle. The vehicle can be parked in the parking lot directly if there is a parking lot available, on the contrary the car can only be parked at a relative safe place. No matter where the car is parked, however, if the parking place is bright enough or has sufficient illumination, it is possible for the driver and passengers to observe the surroundings of the car body easily so as to park the vehicle safely and get off the vehicle smoothly, or get on the car smoothly and start to drive safely. Otherwise, if the parking place is absent of light or dark, the driver and passengers cannot observe the surroundings of the car body clearly, so that it is difficult not only to park and drive the vehicle safely but also get on and off the vehicle. And it is possible to step into hollows and even twist the ankle due to inadvertence, or soil shoes, feet and surroundings, even bringing feculency into the vehicle and thereby fouling the vehicle. Especially before getting on the car, the above said galling instances often happen because the lamp inside the car has not been turned on. Such unsafeness and inconvenience bring a lot of trouble to the driver and passengers. In addition, when the driver makes a turn in driving on a section of a road that is absent of illumination or dark, even if the front and rear lamps are turned on, the driver still may not see the state of the ground in the turning direction or the surroundings of the car body clearly, because light rays of the front or rear lamps are straight horizontal lines. Bad view of the driver results in crashes and scratches easily, especially when there are many pedestrians or non-motor vehicles on the road, or more objects placed by the roadside.

In this regard, the inventor adds an illuminating lamp on the vehicle rearview mirror, which is turned on when required to facilitate the driver and passengers to observe the surroundings of the car body and the status of the ground, so as to make parking and driving safer and make getting-on and off more smoothly. The present application is thereby provided.

SUMMARY OF THE INVENTION

The present invention aims to provide a ground-illuminating lamp for vehicle rearview mirror, which is adapted to various vehicles to facilitate the driver and passengers to observe the surroundings of the car body and the status of the ground around the vehicle rearview mirror, so as to make parking and driving safer and make getting-on and off more smoothly.

Another object of the present invention aims to provide a ground-illuminating lamp for vehicle rearview mirror, which illuminates sides of the vehicle body during turning of vehicle so as to improve the field of view of the driver and to increase safety during turning.

In order to achieve the above objects, the present invention proposes the following solutions.

A ground-illuminating lamp for vehicle rearview mirror comprises a remote controller, a control circuit and an illuminating lamp, wherein the remote controller sends out instructions for turning on or turning off the illuminating lamp to the control circuit according to user's requirements. The control circuit receives the instructions and controls the illuminating lamp to turn on or turn off the illumination, and the illuminating lamp is mounted at the lower portion of the rearview mirror.

The control circuit is also connected to the circuit of the steering lamp, and controls the illuminating lamp to turn on or off by sensing whether the steering lamp is turned on or off.

The rearview mirror is installed at the upper portion of the mirror frame thereof, whereas the illuminating lamp is installed at the lower portion of the mirror frame.

The remote controller is integrated into the central controller of the vehicle.

The control circuit is integrated into the controller of the vehicle.

A vehicle is equipped with the device of the present invention using the above configuration. If the parking place is absent of illumination or dark, or the driver deems it necessary, it is possible to use the remote controller to turn on the illuminating lamp by means of the control circuit, so as to illuminate the surroundings of the vehicle body and the ground below the rearview mirror. The driver himself and passengers can clearly observe the surroundings of the vehicle body around the rearview mirror and the status of the ground, and thereby can park and drive safer and can get on or off more smoothly.

In addition, according to the present invention, the control circuit can sense whether the steering lamp is turned on or off, therefore, when the driver turns on the steering lamp during turning on a section of road that is absent of illumination or dark, the control circuit senses a signal and can thus automatically control to turn on the illuminating lamp, so as to illuminate the ground in the turning direction or the surroundings of the vehicle body and hereby improving the sight lines of the driver. In this way it is possible to find pedestrians or non-motor vehicles, or objects placed by the roadside just in time and take actions at once to avoid crashes and scratches and thus increase safety during turning.

Figure 1:
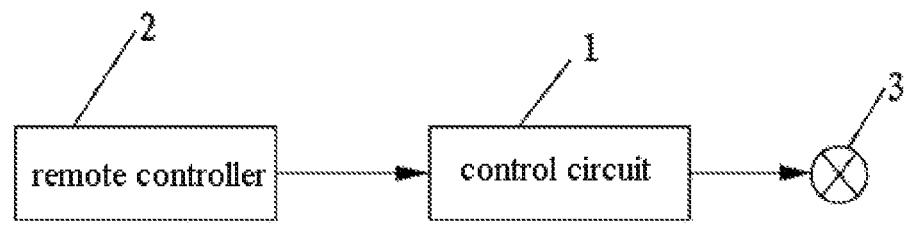
FIG. 1 is a schematic view illustrating the configuration of an embodiment of the present invention.

Meanings of Main Reference Numbers.
control circuit 1,
remote controller 2,
illuminating lamp 3,
rearview mirror 4,
mirror frame 5,
steering lamp 6.

DETAILED DESCRIPTION OF PREFERRED EMBODIMENTS

FIG. 1 shows a preferred embodiment of the present invention. Referring to FIG. 1, a ground-illuminating lamp for vehicle rearview mirror comprises a remote controller 2, a control circuit 1 and an illuminating lamp 3.

The remote controller 2 may be a separate part or be integrated into the central controller of the vehicle. The remote controller 2 is used to send out instructions for turning on or turning off the illuminating lamp 3 to the control circuit 1 according to user's requirements.

The control circuit 1 is used to receive the instructions from the remote controller 2 and controls the illuminating lamp 3 to turn on or turn off. The control circuit 1 can be arranged on any position in the vehicle invisibly as required, or is directly integrated into the controller of the vehicle.

Figure 2:
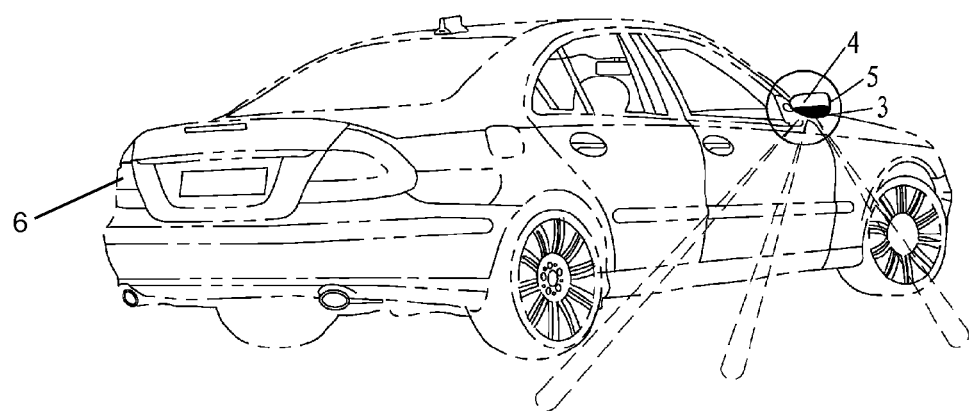
FIG. 2 is a schematic view illustrating a vehicle to which a ground-illuminating lamp according to an embodiment of the present invention is mounted.
Figure 3:
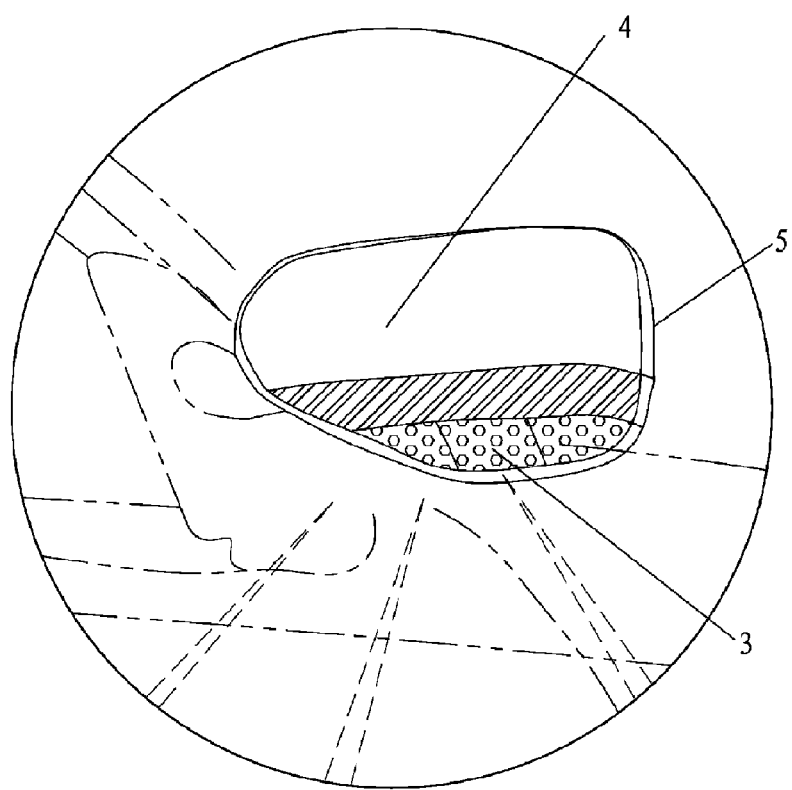
FIG. 3 is an enlarged view of FIG. 2.

The illuminating lamp 3 is mounted at the lower portion of the rearview mirror 4. As shown in FIGS. 2 and 3, in this embodiment, the rearview mirror 4 is installed at the upper portion of the mirror frame 5 thereof, whereas the illuminating lamp 3 is installed at the lower portion of the mirror frame 5. In this way, not only is the normal use of the rearview mirror 4 not influenced in backing, turning, or lanes-changing, but also it is ensured that the illuminating lamp 3 can sufficiently illuminate the vehicle body around the rearview mirror 4 and the ground.

The ground-illuminating lamp according to the present invention can be installed to various vehicles. The user can turn on the illuminating lamp 3 as required to illuminate the surroundings of the vehicle body around the rearview mirror 4 and the status of the ground below the rearview mirror 4, so that the driver himself and passengers can clearly observe the surroundings of the vehicle body, and thereby park and drive safer and get on or off more smoothly.

In order to further increase the safety of the vehicle during turning, the control circuit 1 can also sense whether the steering lamp 6 is turned on or off, and automatically control to turn on or turn off the illuminating lamp 3 by means of the sensed turning-on or tuning-off signal. This can be realized in a plurality of ways. For example, an optical sensor (not shown) can be added in the control circuit 1 to sense whether the steering lamp 6 is turned on or not by means of the light emitted by the steering lamp 6, and to transmit a sensed signal to the control circuit 1. Then the control circuit 1 controls to turn on or turn off the illuminating lamp 3 based on the sensed signal. The control circuit 1 may also be connected to the circuit of the steering lamp 6. When the circuit of the steering lamp 6 is on to turn on the steering lamp 6, the control circuit 1 is on at the same time, so as to allow the control circuit 1 to send a turning-on signal to the illuminating lamp 3. It will be appreciated by persons skilled in the art that other ways can also be used, and here it will not elaborate on them.

During operation of the above device, when the driver turns on the steering lamp 6 during turning on a section of road that is absent of illumination or dark, the control circuit 1 senses a signal and the illuminating lamp 3 is turned on, so that the status of the ground in the turning direction and the surroundings of the vehicle body are illuminated, thereby the sight lines of the driver are improved, and it is possible to find pedestrians or non-motor vehicles, or objects placed by the roadside just in time and thus take actions at once to avoid crashes and scratches and increase safety during turning.

The above embodiments are only for illustrating the technical solutions and features of the present invention rather than limiting the scope of the present invention. All equivalents, variations or modifications based on the spirit of the present invention should be within the scope of the present invention.

What is claimed is:

1. A ground-illuminating lamp for a vehicle rearview mirror, comprising: a remote controller, a control circuit and an illuminating lamp, wherein the remote controller sends out instructions for turning on or turning off the illuminating lamp to the control circuit according to a user's requirements, the control circuit receives the instructions and controls the illuminating lamp to turn on or turn off the illumination, and the illuminating lamp is mounted at a lower portion of the rearview mirror, wherein the control circuit is arranged on any position in the vehicle invisibly as required, or is directly integrated into the remote controller;
   wherein, the control circuit is also connected to a circuit of a steering lamp, and controls to turn on or turn off the illuminating lamp by sensing whether the steering lamp is turned on or not; and
   wherein the control circuit further comprises an optical sensor to sense whether the steering lamp is turned on or not by means of a light emitted by the steering lamp, and to transmit a sensed signal to the control circuit.

2. The ground-illuminating lamp for the vehicle rearview mirror of claim 1, wherein, the rearview mirror is installed at an upper portion of a mirror frame thereof, whereas the illuminating lamp is installed at a lower portion of the mirror frame.

3. The ground-illuminating lamp for the vehicle rearview mirror of claim 1, wherein, the remote controller is integrated into a central controller of the vehicle.

4. The ground-illuminating lamp for the vehicle rearview mirror of claim 1, wherein, the control circuit is integrated into a controller of the vehicle.

5. The ground-illuminating lamp for the vehicle rearview mirror of claim 1, wherein, when the circuit of the steering lamp is on to turn on the steering lamp, the control circuit is on at the same time, so as to allow the control circuit to send a turning-on signal to the illuminating lamp.

* * * * *